US011996690B2

(12) United States Patent
Vanevenhoven et al.

(10) Patent No.: US 11,996,690 B2
(45) Date of Patent: May 28, 2024

(54) TRANSFORMER RECTIFIER UNIT (TRU) BACKFEED INTERLOCK

(71) Applicant: Hamilton Sundstrand Corporation, Charlotte, NC (US)

(72) Inventors: Jordan K. Vanevenhoven, Rockford, IL (US); Jeffrey D. Myroth, Roscoe, IL (US); Jef William Good, German Valley, IL (US); Shane R. Traser, Rockford, IL (US); John N. Buzzard, Rockford, IL (US); Kyle Stephen Ives, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 327 days.

(21) Appl. No.: 17/519,857

(22) Filed: Nov. 5, 2021

(65) Prior Publication Data

US 2023/0147395 A1 May 11, 2023

(51) Int. Cl.
*H02H 7/22* (2006.01)
*H02H 1/00* (2006.01)
*H02J 4/00* (2006.01)

(52) U.S. Cl.
CPC ............ *H02H 7/22* (2013.01); *H02H 1/0007* (2013.01); *H02J 4/00* (2013.01)

(58) Field of Classification Search
CPC ..... B64D 2221/00; B64D 41/007; B64F 5/60; G01R 31/008; G01R 31/62; H02H 1/0007; H02H 3/08; H02H 3/50; H02H 7/22; H02J 1/084; H02J 2310/44; H02J 3/007; H02J 3/02; H02J 4/00; H02J 5/00; H02M 7/068
See application file for complete search history.

(56) References Cited

U.S. PATENT DOCUMENTS

| 3,646,355 | A | 2/1972 | Ireland et al. |
| 6,256,213 | B1 * | 7/2001 | Illingworth ......... H02M 7/2176 |
| | | | 363/69 |
| 6,825,578 | B2 | 11/2004 | Perttu |
| 7,138,729 | B2 | 11/2006 | Bailey |
| 10,389,114 | B2 * | 8/2019 | Matheson ................. H02J 1/10 |

(Continued)

FOREIGN PATENT DOCUMENTS

| CN | 115733117 A * | 3/2023 |
| EP | 3883081 A1 | 9/2021 |

(Continued)

OTHER PUBLICATIONS

Extended European Search Report dated Apr. 6, 2023, issued during the prosecution of European Patent Application No. EP 22205160.9.

*Primary Examiner* — Jared Fureman
*Assistant Examiner* — Nicolas Bellido

(57) ABSTRACT

A system includes a transformer rectifier unit (TRU) including a backfeed sense module. A contactor is operatively connected to the TRU for selectively supplying DC power to a DC bus from the TRU with the contactor closed and isolating the DC bus from the TRU with the contactor opened. A contactor driver is operatively connected to receive a signal from the backfeed sense module and to control opening and closing of the contactor based on the signal. The contactor driver is configured to open the contactor upon receipt of the signal indicative of backfeed detected in the TRU.

20 Claims, 3 Drawing Sheets

(56) References Cited

U.S. PATENT DOCUMENTS

| | | |
|---|---|---|
| 11,114,853 B2 | 9/2021 | Donahue et al. |
| 2006/0043792 A1 | 3/2006 | Hjort et al. |
| 2016/0144974 A1* | 5/2016 | Matheson ................. H02J 1/10 |
| | | 363/69 |
| 2021/0288488 A1* | 9/2021 | Seagren ................ H02M 7/068 |
| 2023/0251329 A1* | 8/2023 | Vanevenhoven ......... H02J 3/02 |
| | | 324/547 |

FOREIGN PATENT DOCUMENTS

| | | |
|---|---|---|
| EP | 3883104 A1 | 9/2021 |
| RU | 2366071 C1 * | 8/2009 |
| WO | 2010047711 A1 | 4/2010 |

* cited by examiner

TRANSFORMER RECTIFIER UNIT (TRU) BACKFEED INTERLOCK

BACKGROUND

1. Field

The present disclosure relates to power supply and distribution, and more particularly to power supply and distribution such as in aircraft.

2. Description of Related Art

In traditional aircraft electrical power systems, a DC essential bus is able to be fed from a primary or normal power source such as a Transformer Rectifier Unit (TRU), potentially via a DC bus, and also fed from an alternate or emergency power source such as an essential TRU, which would be powered by a Ram Air Turbine (RAT) in an electrical emergency. When a TRU is powered, primary system contactors are closed to power the respective DC essential bus. When the TRU is not powered, the same primary system contactors are opened, and an alternate system contactor is closed to power the DC essential bus from an alternate source. One of the primary system contactors is opened to prevent a DC bus load from overloading the alternate power source.

To ensure independence between the primary and alternate systems, some applications use an AC relay and interlock which would open the primary system contactors if TRU input power is lost to ensure proper load shed. Here, when the AC input power to the TRU is lost, the relay would open the first primary system contactor coil return, forcing the contactor open regardless of the contactor driver command. The second primary system contactor may be opened directly by this or via interlock with first primary system contactor.

However, there may not be sufficient room in the AC system for an AC relay, and simply placing a DC relay downstream of the TRU will not provide equivalent function if the TRU were to backfeed from some other source such as a battery after the AC input power is lost. A method is needed to account for these limitations.

The conventional techniques have been considered satisfactory for their intended purpose. However, there is an ever present need for improved systems and methods for power supply and distribution such as in aircraft. This disclosure provides a solution for this need.

SUMMARY

A system includes a transformer rectifier unit (TRU) including a backfeed sense module. A contactor is operatively connected to the TRU for selectively supplying DC power to a DC bus from the TRU with the contactor closed and isolating the DC bus from the TRU with the contactor opened. A contactor driver is operatively connected to receive a signal from the backfeed sense module and to control opening and closing of the contactor based on the signal. The contactor driver is configured to open the contactor upon receipt of the signal indicative of backfeed detected in the TRU.

The TRU can include a first AC input line, a second AC input line, and a third AC input line all operatively connected to supply AC power from an AC bus to the TRU. The backfeed sense module can include one or more voltage, current, and/or power sensors operatively connected to the first AC input line, second AC input line, and third AC input line. The TRU can include a first DC output line and a second DC output line both operatively connected to supply DC power to a DC bus from the TRU. The backfeed sense module can be configured to produce and output the signal to the contactor driver with information indicative of backfeed detected in the TRU.

The contactor driver can be configured to open the contactor upon receiving the signal with information indicative of backfeed in the TRU, in the event of no AC voltage, current and/or power sensed in the first, second, and third AC inputs. The contactor driver can be configured to open the contactor upon receiving the signal with information indicative of backfeed in the TRU, in the event of DC voltage, current and/or power sensed in the first and second DC inputs. The contactor driver can be operatively connected to control a coil of the contactor. The coil can be operatively connected to a return. A relay can be operatively connected to the backfeed sense module, and operatively connected between the contactor driver and the coil. It is also contemplated that the relay can be operatively connected between the coil and the return.

The TRU can be a first TRU, wherein the contactor can be a first TRU contactor, and the system can include a first AC bus configured to supply power from a first AC power source, a second AC bus configured to supply power from a second AC power source, the first TRU connecting a first DC bus to the first AC bus through the first TRU contactor, and a second TRU connecting a second DC bus to the second AC bus through a second TRU contactor. A first DC essential bus can be connected to the first DC bus through a first essential contactor. A second DC essential bus can be connected to the second DC bus through a second essential contactor. An essential TRU can be connected to a third DC essential bus through an essential TRU contactor. A first essential tie contactor (ETC) can selectively connect between the first DC essential bus and the third DC essential bus. A second ETC can selectively connect between the third DC essential bus and the second DC essential bus. An AC essential bus tie contactor (AETC) can selectively connect between an AC essential bus and the first and second AC busses. A ram air turbine (RAT) line contactor can connect between the AETC and the AC essential bus to selectively connect a RAT to the AC essential bus.

A method of distributing power includes powering a DC bus with power from a transformer rectifier unit (TRU) thorough a contactor and detecting backfeed in the TRU. The method includes opening the contactor to disconnect the DC bus from the TRU in response to detecting the backfeed in the TRU.

Detecting backfeed in the TRU can include monitoring one or more AC input lines to the TRU and monitoring one or more DC output lines from the TRU. The method can include determining there is backfeed in the TRU if there is voltage, current and/or power detected in the DC output lines but no voltage, current and/or power detected at the AC input lines. Determining there is backfeed in the TRU can include using one or more proxies for direct AC power sensor and/or for direct DC power sensing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
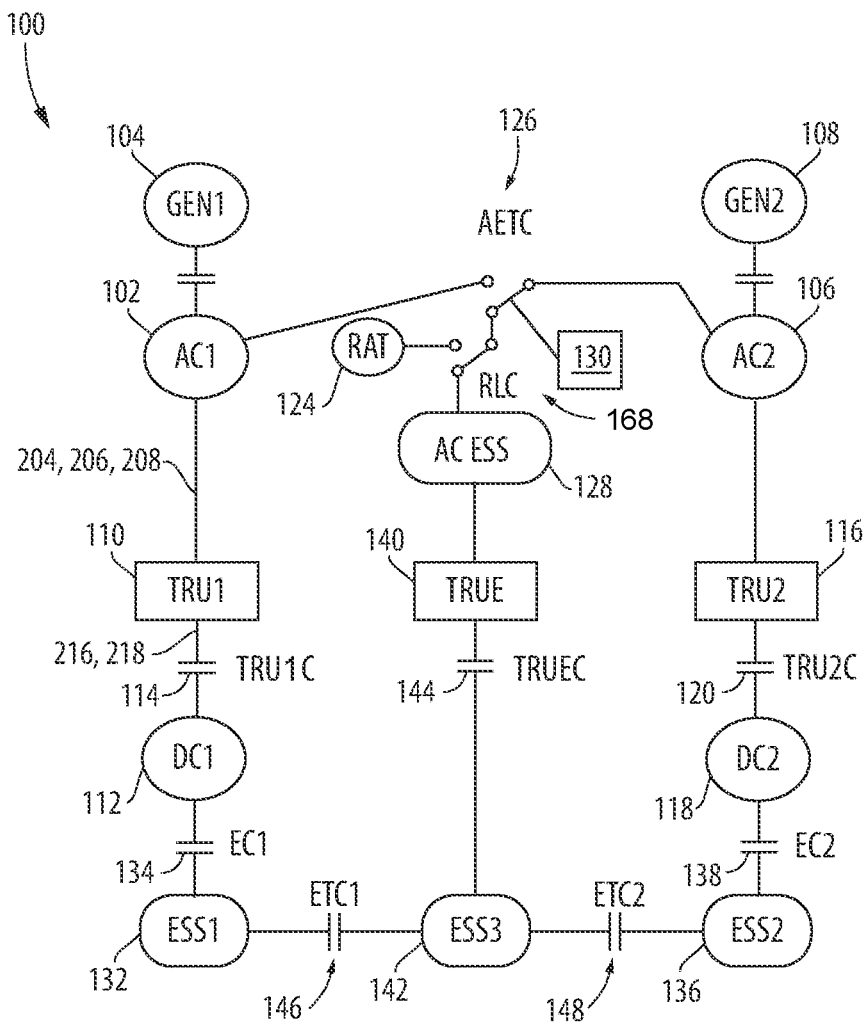
FIG. 1 is a schematic view of an embodiment of a system constructed in accordance with the present disclosure, showing the AC and DC busses and the contactors interconnecting the same.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide power distribution such as in aircraft systems while avoiding backfeed in the transformer rectifier units (TRUs).

The system 100 includes a first AC bus 102 configured to supply power from a first AC power source, e.g. generator 104. A second AC bus 106 is configured to supply power from a second AC power source, e.g. generator 108. A first transformer rectifier unit (TRU) 110 connects a first DC bus 112 to the first AC bus 102 through a first TRU contactor (TRUC) 114. A second TRU 116 connects a second DC bus 118 to the second AC bus 106 through a second TRUC 120.

An AC essential bus tie contactor (AETC) 126 can selectively connect between an AC essential bus 128 and the first and second AC busses 102, 106. An AETC controller 130 is connected to switch the AETC 126 between a first state connecting the AC essential bus 128 to the first AC bus 102 and a second state connecting the AC essential bus 128 to the second AC bus 106. A first DC essential bus 132 is connected to the first DC bus 112 through a first essential contactor (EC) 134. A second DC essential bus 136 is connected to the second DC bus 118 through a second EC 138. An essential TRU 140 can be connected to a third DC essential bus 142 through an essential TRUC 144.

A first essential tie contactor (ETC) 146 can selectively connect between the first DC essential bus 132 and the third DC essential bus 142. A second ETC 148 can selectively connect between the third DC essential bus 142 and the second DC essential bus 136. A ram air turbine (RAT) line contactor 168 connects between the AETC 126 and the AC essential bus 128 to selectively connect a RAT 124 to the AC essential bus 128. The AC and DC essential busses 128, 132, 136, and 142 can potentially be powered even if only one of the generators 104, 108 or RAT 124 is available, by controlling the various contactors.

Figure 2:
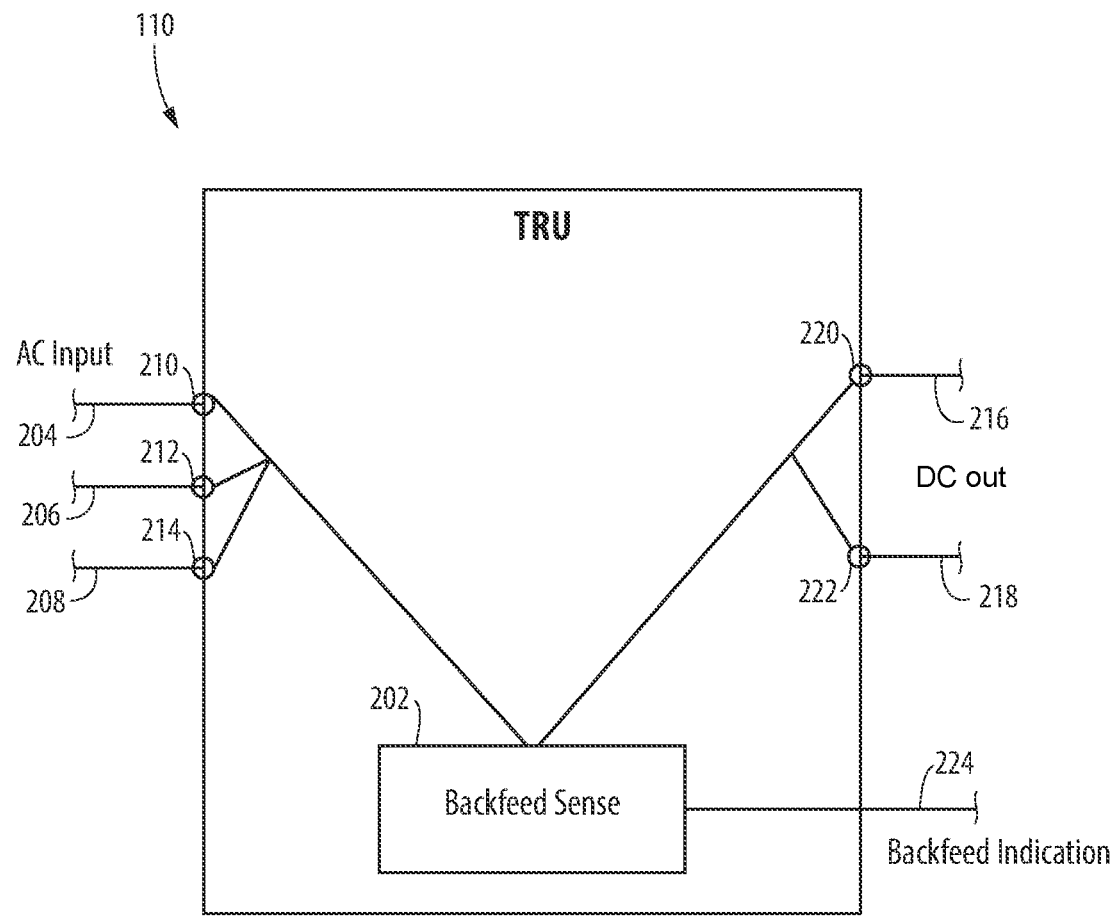
FIG. 2 is a schematic view of one of the transformer rectifier units (TRU) of FIG. 1, showing the backfeed sense module.

With reference now to FIG. 2, one of the TRUs namely TRU 110, is shown. However those skilled in the art will readily appreciate that any or all of the TRUs 110, 116, 140 can include the same components as described herein with reference to TRU 110. The TRU 110 includes a backfeed sense module 202. The TRU 110 includes a first AC input line 204, a second AC input line 206, and a third AC input line 208 all operatively connected to supply AC power from an AC bus (e.g. AC bus 102 of FIG. 1) to the TRU 110. The backfeed sense module 202 includes a respective sensor 210, 212, 214, each operatively connected to the first AC input line 204, second AC input line 206, and third AC input line 208.

The TRU includes a first DC output line 216 and a second DC output line 218 both operatively connected to supply DC power to a DC bus, e.g. DC bus 112 of FIG. 1, from the TRU 110. The backfeed sense module 202 includes a respective sensor 220, 222, each operatively connected to the first DC output line 216 and the second DC output line 218. The sensor(s) 210, 212, 214, 220, 222 can be voltage sensors or any other suitable sensor type, e.g. current sensors, power sensors, or the like, for detecting voltage, current, and/or power in lines.

Figure 3:
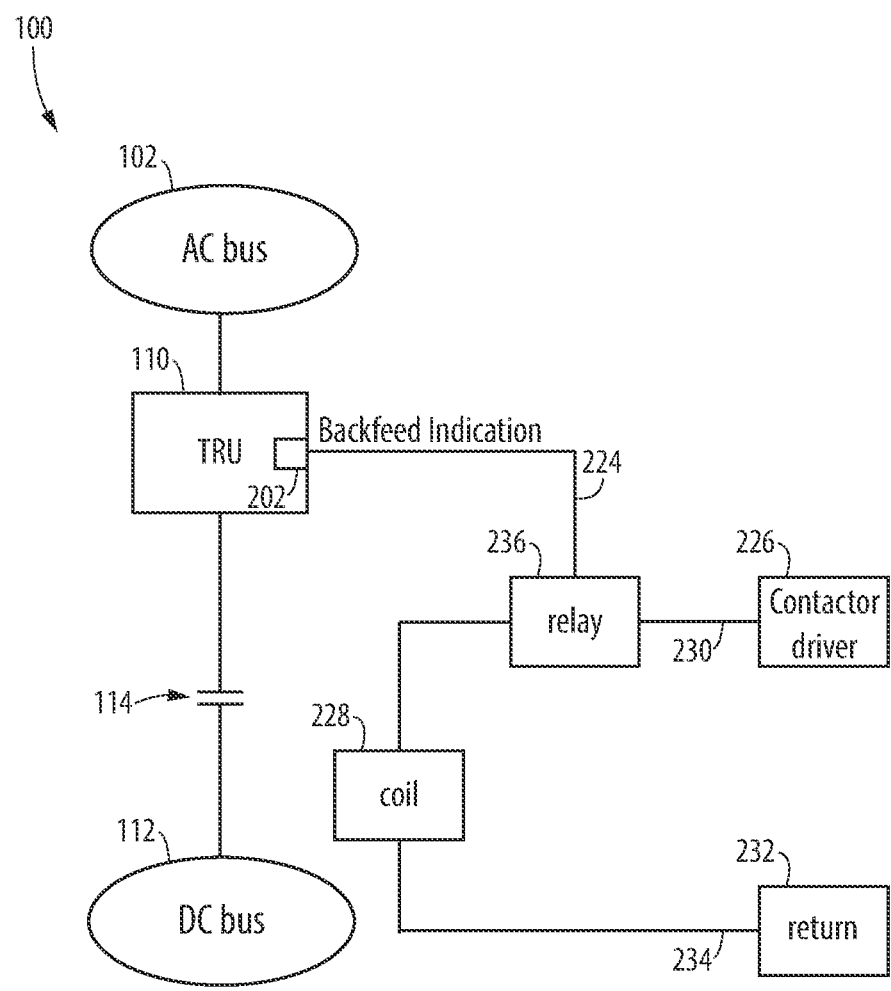
FIG. 3 is a schematic view of a portion of the system of FIG. 1, showing the contactor driver.

With reference now to FIG. 3, the backfeed sense module 202 is configured to produce and output a signal, e.g. in signal line 224 (also shown in FIG. 2), to a contactor driver 226 with information indicative of backfeed detected in the TRU 110. The contactor driver 226 is operatively connected to receive the signal from the backfeed sense module 202 and to control opening and closing of the contactor 114 based on the signal. The contactor driver 226 is configured to open the contactor 114 upon receipt of the signal indicative of backfeed detected in the TRU 110. The contactor driver 226 is configured to open the contactor 114 in the event of no AC voltage, current and/or power sensed in the first, second, and third AC inputs 210, 212, 214 (shown in FIG. 2) but wherein there is DC voltage, current and/or power sensed in the first and second DC inputs 220, 222 (shown in FIG. 2).

With continued reference to FIG. 3, the contactor driver 226 is operatively connected to control a coil 228, e.g. a solenoid coil of the contactor 114, through line 230. The coil 228 is operatively connected to a return 232 by line 234. A relay 236 in line 230 is operatively connected between the contactor driver 226 and the coil 228 to relay the signal from the backfeed sense module 202 and to power or depower the coil 228. It is also contemplated that the relay 236 can instead be operatively connected in line 234 between the coil 228 and the return 232. The relay 236, contactor driver 226, and coil 228 form a relay interlock for the contactor 114.

A method of distributing power includes powering a DC bus (e.g. DC bus 112, 118 of FIG. 1) with power from a TRU (e.g. TRU 110, 140, 116 of FIG. 1) thorough a contactor (e.g. contactor 114, 120, 144 of FIG. 1) and detecting backfeed in the TRU. The method includes opening the contactor to disconnect the DC bus from the TRU in response to detecting the backfeed in the TRU. Detecting backfeed in the TRU includes monitoring one or more AC input lines (e.g. AC input lines 204, 206, 208 of FIG. 2) to the TRU and monitoring one or more DC output lines (e.g. DC output lines 216, 218 of FIG. 2) from the TRU. The method includes determining there is backfeed in the TRU if there is voltage, current and/or power detected in the DC output lines but no voltage, current and/or power detected at the AC input lines. The backfeed sense module 202 and/or contactor driver 226 can include machine readable instructions configured to carry out the methods disclosed herein, which can include analog, digital, and/or electronic circuit implemented machine readable instructions.

Potential benefits of systems and methods as disclosed herein include eliminating AC relays that is internal to the AC busses. All three TRUs can have backfeed sensing using direct AC input and/or direct DC input, or can use one or more proxies for direct AC or DC input such as using an engine's fan status as a proxy for direct AC sensing, or using TRU internal power available as a proxy for direct DC sensing.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for power distribution such as in aircraft systems while avoiding backfeed in the transformer rectifier units (TRUs). While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a transformer rectifier unit (TRU) including a backfeed sense module;
   a contactor operatively connected to the TRU for selectively supplying DC power to a DC bus from the TRU with the contactor closed and isolating the DC bus from the TRU with the contactor opened; and
   a contactor driver operatively connected to receive a signal from the backfeed sense module and to control opening and closing of the contactor based on the signal, wherein the contactor driver is configured to open the contactor upon receipt of the signal indicative of backfeed detected in the TRU, wherein the TRU is a first TRU, wherein the contactor is a first TRU contactor, and further comprising:
   a first AC bus configured to supply power from a first AC power source;

a second AC bus configured to supply power from a second AC power source;

the first TRU connecting a first DC bus to the first AC bus through the first TRU contactor;

a second TRU connecting a second DC bus to the second AC bus through a second TRU contactor;

a first DC essential bus connected to the first DC bus through a first essential contactor;

a second DC essential bus connected to the second DC bus through a second essential contactor;

an essential TRU connected to a third DC essential bus through an essential TRU contactor;

a first essential tie contactor (ETC) selectively connecting between the first DC essential bus and the third DC essential bus;

a second ETC selectively connecting between the third DC essential bus and the second DC essential bus;

an AC essential bus tie contactor (AETC) selectively connecting between an AC essential bus and the first and second AC busses; and a ram air turbine (RAT) line contactor connecting between the AETC and the AC essential bus to selectively connect a RAT to the AC essential bus.

2. The system as recited in claim 1, wherein the TRU includes a first AC input line, a second AC input line, and a third AC input line all operatively connected to supply AC power from an AC bus to the TRU.

3. The system as recited in claim 2 wherein the backfeed sense module includes one or more voltage, current and/or power sensors operatively connected to the first AC input line, second AC input line, and third AC input line.

4. The system as recited in claim 3, wherein the TRU includes a first DC output line and a second DC output line both operatively connected to supply DC power to a DC bus from the TRU.

5. The system as recited in claim 4, wherein the backfeed sense module is configured to produce and output the signal to the contactor driver with information indicative of backfeed detected in the TRU.

6. The system as recited in claim 5, wherein the contactor driver is configured to open the contactor upon receiving the signal with information indicative of backfeed in the TRU, in the event of no AC voltage, current and/or power sensed in the first, second, and third AC inputs.

7. The system as recited in claim 6, wherein the contactor driver is configured to open the contactor upon receiving the signal with information indicative of backfeed in the TRU, in the event of DC voltage, current and/or power sensed in the first and second DC output lines.

8. The system as recited in claim 1, wherein the contactor driver is operatively connected to control a coil of the contactor.

9. The system as recited in claim 8, wherein the coil is operatively connected to a return.

10. The system as recited in claim 9, further comprising a relay operatively connected to the backfeed sense module, and operatively connected between the contactor driver and the coil.

11. The system as recited in claim 9, further comprising a relay operatively connected to the backfeed sense module, and operatively connected between the coil and the return.

12. A system comprising:

a transformer rectifier unit (TRU) including a backfeed sense module;

a contactor operatively connected to the TRU for selectively supplying DC power to a DC bus from the TRU with the contactor closed and isolating the DC bus from the TRU with the contactor opened; and a contactor driver operatively connected to receive a signal from the backfeed sense module and to control opening and closing of the contactor based on the signal, wherein the contactor driver is configured to open the contactor upon receipt of the signal indicative of backfeed detected in the TRU.

13. The system as recited in claim 12, wherein the TRU includes a first AC input line, a second AC input line, and a third AC input line all operatively connected to supply AC power from an AC bus to the TRU.

14. The system as recited in claim 13, wherein the backfeed sense module includes one or more voltage, current and/or power sensors operatively connected to the first AC input line, second AC input line, and third AC input line.

15. The system as recited in claim 14, wherein the TRU includes a first DC output line and a second DC output line both operatively connected to supply DC power to a DC bus from the TRU.

16. The system as recited in claim 15, wherein the backfeed sense module is configured to produce and output the signal to the contactor driver with information indicative of backfeed detected in the TRU.

17. The system as recited in claim 16, wherein the contactor driver is configured to open the contactor upon receiving the signal with information indicative of backfeed in the TRU, in the event of no AC voltage, current and/or power sensed in the first, second, and third AC inputs.

18. The system as recited in claim 17, wherein the contactor driver is configured to open the contactor upon receiving the signal with information indicative of backfeed in the TRU, in the event of DC voltage, current and/or power sensed in the first and second DC output lines.

19. The system as recited in claim 12, wherein the contactor driver is operatively connected to control a coil of the contactor.

20. The system as recited in claim 19, wherein the coil is operatively connected to a return.

* * * * *